Dec. 6, 1966   A. K. HEILALA   3,289,620
COMBUSTION FURNACES
Filed Oct. 12, 1964   4 Sheets-Sheet 1

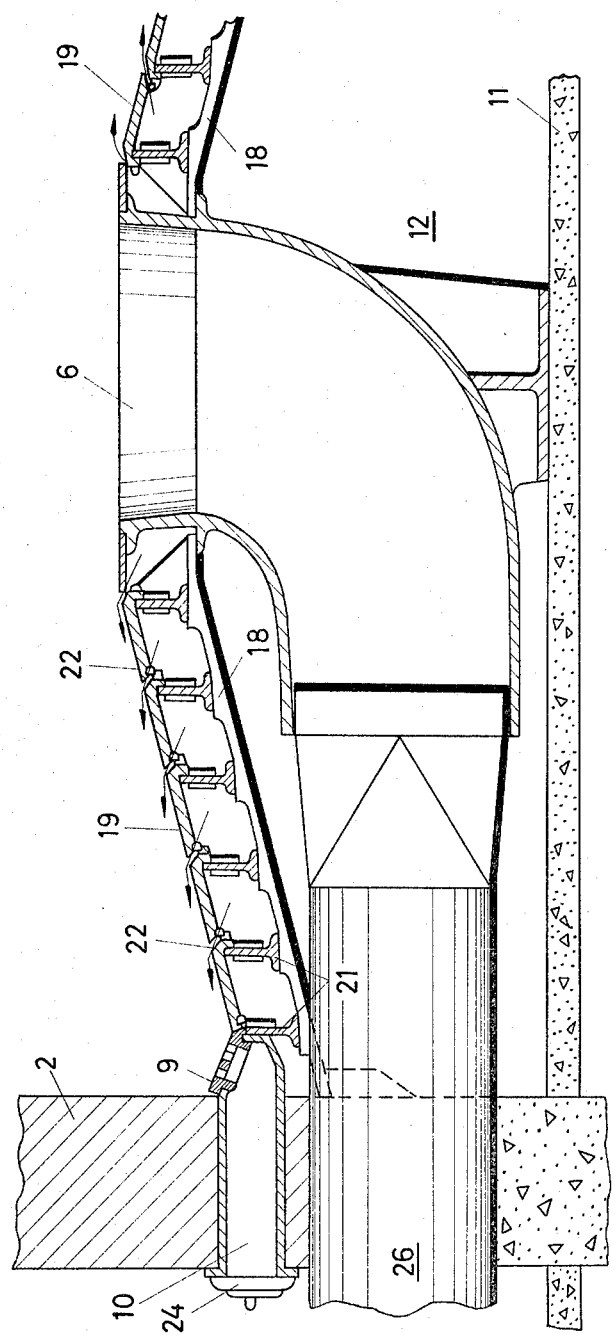

United States Patent Office 3,289,620
Patented Dec. 6, 1966

3,289,620
COMBUSTION FURNACES
Antti K. Heilala, Kaipola, Finland, assignor to Aktiebolaget Gotaverken, Goteborg, Sweden, a corporation of Sweden
Filed Oct. 12, 1964, Ser. No. 403,169
Claims priority, application Sweden, Oct. 23, 1963, 11,617/63
3 Claims. (Cl. 110—45)

The present invention refers primarily to combustion furnaces of the type, where fuel is fed to the central part of a grate provided with openings for primary air and constituting the bottom of the furnace and where the combustion gases are rotated by means of tangentially directed secondary air ejected from orifices in the side wall of the furnace. Known furnaces of this type adapted for the combustion of granulated or finely divided solid fuel usually have a grate with openings for the combustion air which has the same dimension as the cross section of the furnace. Certain fuels such as bark, saw mill refuse or the like are often mixed with sand, gravel or similar impurities. During the combustion these impurities will be transformed into a slag, which has a tendency to clog the air openings in the grate in such a manner that these after a short period of time will be out of use. The slag must be removed periodically, which hitherto has been possible only when the furnace is out of action.

One object of the invention is to obtain a furnace having a grate upon which even finely divided solid fuel may be burned without risk of fuel particles falling through the air openings in the grate.

Another object of the invention is to provide a pyramid shaped grate upon which the fuel will be completely combusted before it, while sliding down the sloping sides of the pyramid, reaches the side wall of the combustion chamber.

A further object of the invention is to provide means for collecting un-combustible particles in a margin belt surrounding the grate and for removing said particles therefrom.

Another object of the invention is to design the furnace in such a manner that the air streams emerging from the grate aids in bringing un-combustible particles towards the collecting belt.

A further object of the invention is to arrange the furnace in such a manner that it is possible to remove the un-combustible products while the furnace is in full use.

Figure 1:
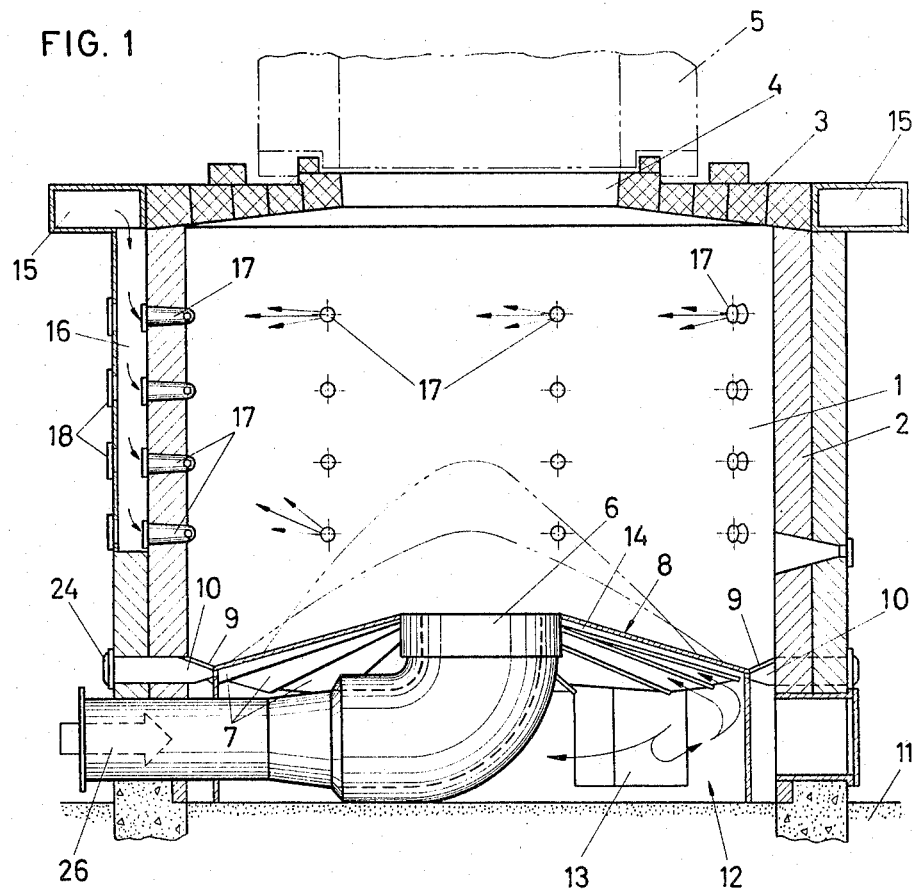
Figure 6:
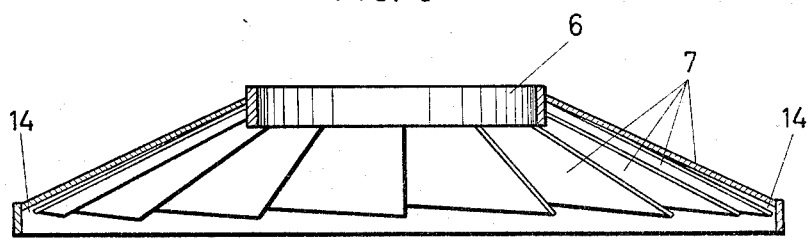
Figure 2:
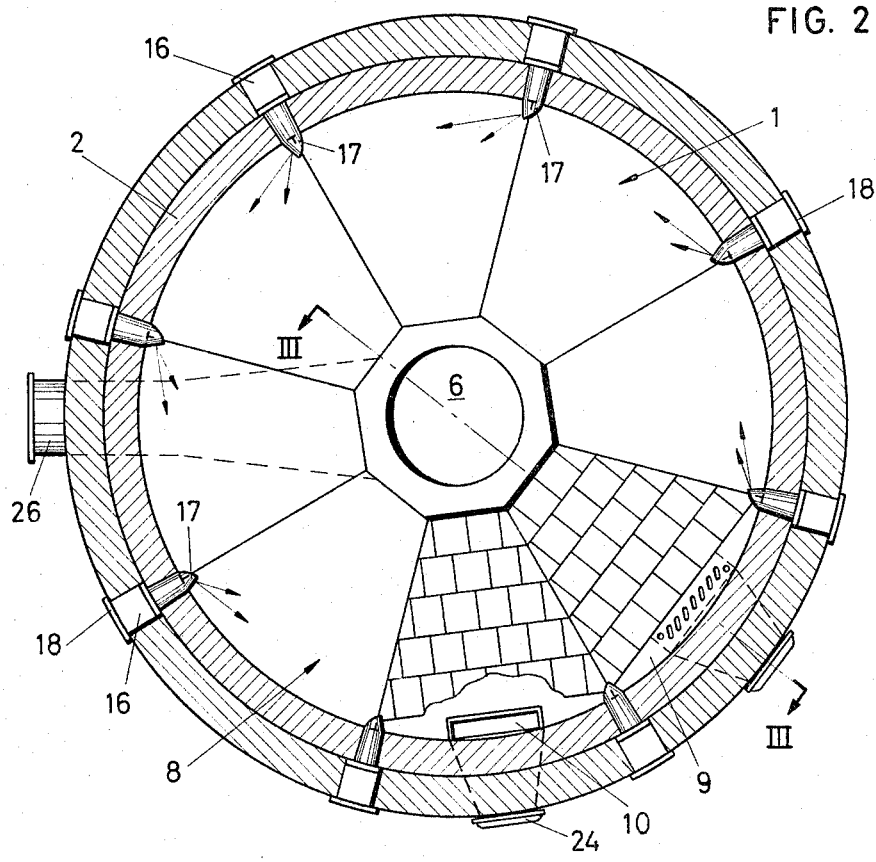
Figure 5:
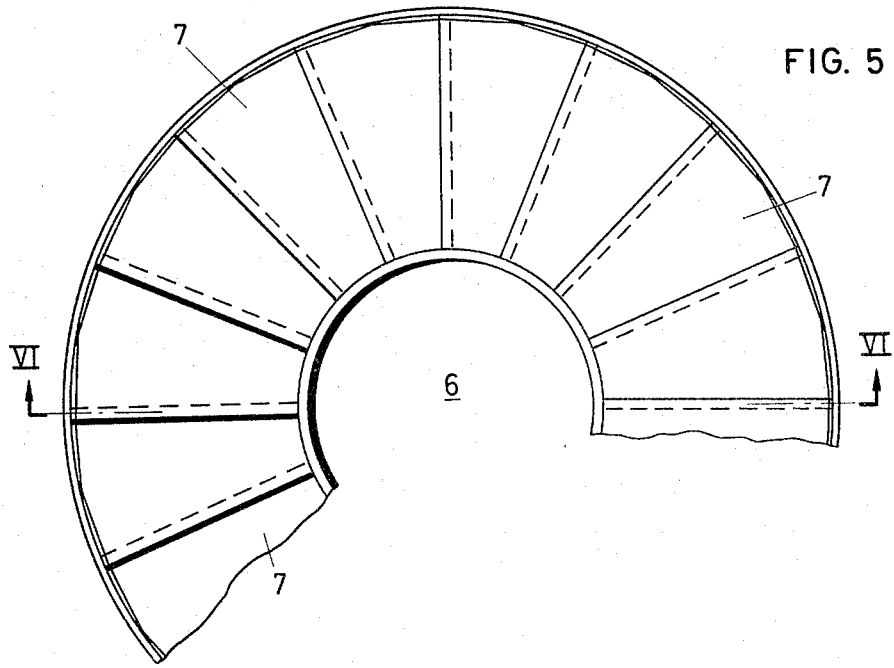
Figure 4:
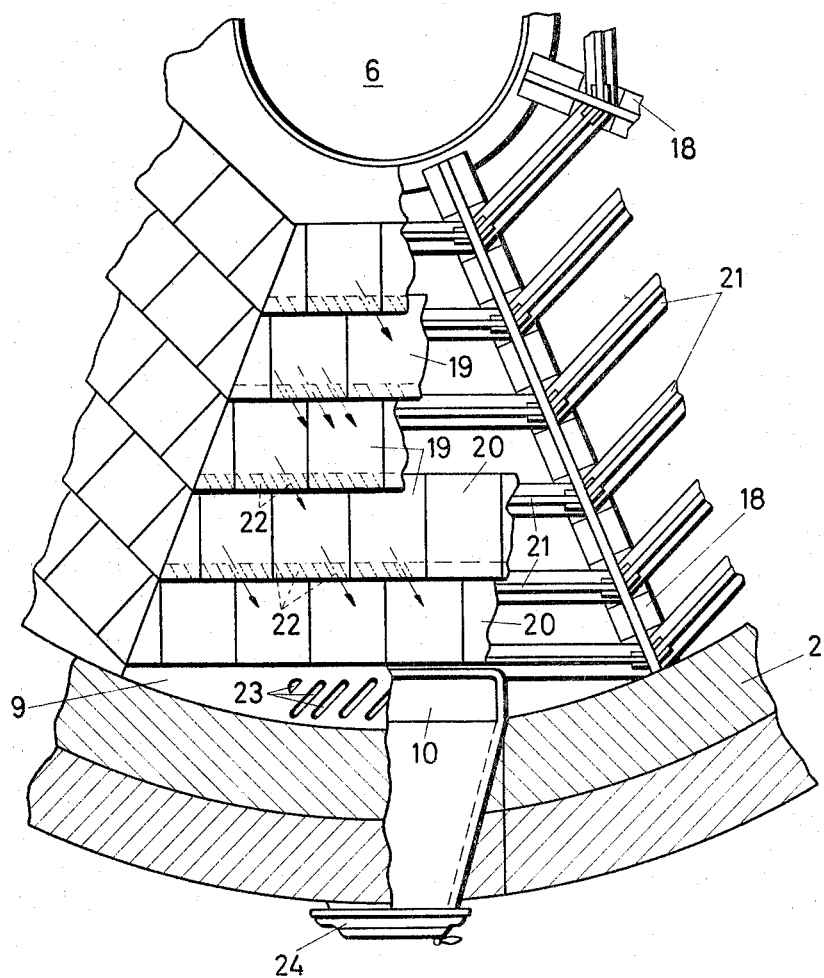
Figure 7:
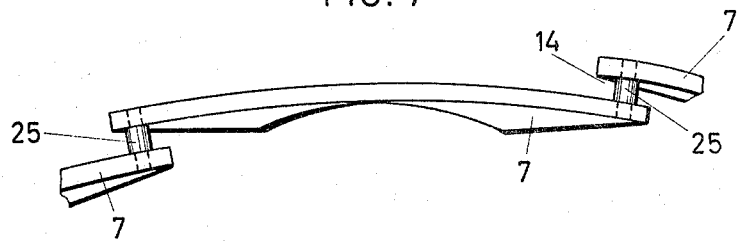

On the drawings:
FIGURE 1 shows a cross section through a cyclone furnace according to the invention.
FIGURE 2 is a horizontal section along lines II—II in FIGURE 1 but in a furnace provided with a grate of slightly modified design.
FIGURE 3 shows on a larger scale a vertical section along line III—III in FIGURE 2.
FIGURE 4 shows a view seen from above and partly in section of part of the grate with a slag collecting pocket.
FIGURE 5 shows details of the grate according to FIGURE 1 in plan view.
FIGURE 6 is a section along line VI—VI in FIGURE 5.
FIGURE 7 is an end view of the grate according to FIGURES 5 and 6 as seen obliquely from below.

According to FIGURE 1 the furnace consists of a vertical cylinder shaped chamber 1 with a refractory lining 2.

The furnace is covered by a roof 3 having a central outlet 4, which has considerably smaller cross sectional area than the furnace and which may be connected to the lower part of a steam boiler 5. A mechanical stoker (not shown in detail) is arranged to feed fuel from below into a pot 6 arranged centrally in the lower part of the furnace. A grate 8 consisting of tile shaped members 7 having overlapping edges is arranged around this pot. The grate is shaped like a cone or a multi sided pyramid and may generally speaking be called tent shaped. It is surrounded by and distanced from the circular wall by a slag collecting belt 9. This is horizontal or may be reversedly inclined in relation to the grate. The belt will consist of a series of circular segments. Each segment is perforated in its middle part and forms a connection with slag collecting pocket 10, which is accessible from the outside of the furnace. The efficient grate area is thus considerably smaller than the cross section of the furnace chamber.

The space between the grate and the slag collecting belt is divided by means of suitable walls into two separate compartments. The grate is designed to prevent a sifting-through of solid particles and it is thus possible to remove the ash and slag without disturbing the primary air supply. The ash and slag compartment may be designed as an annular chamber but is preferably subdivided into a number of separate pockets.

The compartment 12 defined by the grate 8, outside wall 2 and the floor 11 communicate with an air supply conduit 13 for primary air, which is intended to be forced through a number of slots 14 in the grate 8. Close by the roof 3 of the furnace there is a second supply conduit 15, which feeds secondary air to a number of vertical distributors 16. A number of air boxes 17 are arranged above each other and in communication with these distributors 16. These are provided with openings having lids 18 which make the boxes 17 accessible for adjustment of the orifice even when the furnace is in operation.

The gate 8 is subdivided into a number of sectors supported by beams 18. In the embodiment according to FIGURES 2-4 the grate is composed of rectangular tiles 19 and 20 supported by beams 21, mainly in the same manner as roof tiles, that is in such a manner that an upper tile overlaps a lower tile. The tiles 19 are at their lower edge provided with oblique grooves 22, which permit a passage of primary air along the plane of the grate but which prevent particles of fuel to pass down into the room 12 below the grate. Tiles 20 are not provided with such grooves. The collecting belt 9 for ash and slag is provided with opening 23 directly above the collecting pockets 10. The latter are provided with air tight covers 24.

The grate 8 shown in FIGURE 1 and FIGURES 5-7 differs from that shown in FIGURES 2-4 in that it is subdivided into several sectors of a circle ring. Each tile 7 forms such a sector and these overlap each other. In order to provide a passage for primary air along the plane of the grate the tiles are at their overlapping edges separated by lugs 25. Even on this occasion the overlapping will prevent fuel particles from falling down into the pit.

The furnace is operated in the following manner. Fuel is fed by means of a screw or ram, not shown, through conduit 26 into pot 6 and raises to a certain level thereabove. During the combustion it will slide downwards all around the pot along the sloping grate surface. The grate has such an extension in relation to the angle of repose for the fuel in question that the fuel is completely consumed on the grate. The shape of two fuel beds defined by the angle of repose for two different types of fuel are shown by dash-dotted lines in the drawing. An essential qualification for a complete combustion of the fuel is the secondary air, which imposes a rotating movement to the pillar of gas and fuel particles within the furnace. Fuel particles lifted from the fuel bed by the gas stream are retained in the combustion furnace through the cyclone action and will under successive drying and charring move in a helical part towards the flame outlet, where they as light ash particles flow out together with the gases. The rotating gas movement is initiated already within the fuel bed through the action of the primary air. The direction of this air along the plane of the grate downwards and toward the slag collecting belt 9 will effectively help to bring the slag particles to the pockets 10, whereby a clogging of the air passages 22 is avoided. The last row of tiles in the grate and possible some tiles to the right of each pocket 10 will not be provided with passages 22 for primary air.

What I claim is:

1. In a furnace provided with a vertical cyclone action combustion chamber having a bottom structure for separating said chamber from a space therebelow and means for feeding fuel into the furnace
- a tent shaped grate provided with air passage in its sloping parts, said tent-shaped grate forming the central part of said bottom structure, said grate having a base area smaller than the cross section of the combustion chamber but with sufficient area to ensure combustion of the fuel supplied while the same is sliding down the grate
- a partially perforated ash and slag collecting belt surrounding the base of the grate and extending from the grate to the wall of the combustion chamber said perforations being spaced from the base line of the grate
- walls for subdividing the space below the bottom structure into a first compartment below the grate and a second compartment below the collecting belt
- means to supply combustion air to the first compartment only and further means to remove ash and slag from the second compartment without contact with the combustion air, the air passages in the grate being arranged in a manner to augment the transportation of ash and slag from the grate to the perforations in the belt.

2. A combustion furnace according to claim 1, in which a pyramid shaped grate is arranged in such a manner in a combustion chamber with a circular cross section, that the ash and slag collecting belt will consist of a series of segments, a group of perforations being arranged in the middle part of each segment the second compartment being subdivided into a number of pockets each being in communication with one such group of perforations.

3. In a furnace provided with a vertical cyclone action combustion chamber having a bottom structure for separating said chamber from the space therebelow and means for feeding fuel into the furnace
- a pyramid shaped grate composed of overlapping tile members forming the central part of said bottom structure, said grate having a base area smaller than the cross section of the combustion chamber
- an ash and slag collecting belt surrounding the grate and extending from the grate to the wall of the combustion chamber
- groups of perforations in said collecting belt and air passages between the tiles of the grate directed towards said group of perforations
- walls for subdividing the space below the bottom structure into a first compartment below the grate and a second compartment below the collecting belt
- and means to supply combustion air to the first compartment and to remove ash and slag from the second compartment.

References Cited by the Examiner

UNITED STATES PATENTS

| | | | |
|---|---|---|---|
| 459,518 | 9/1891 | Brown | 110—45 |
| 7,153,979 | 9/1915 | Virden | 110—45 |
| 2,702,013 | 2/1955 | Atteberry | 110—45 X |

KENNETH W. SPRAGUE, *Primary Examiner.*

UNITED STATES PATENT OFFICE
CERTIFICATE OF CORRECTION

Patent No. 3,289,620                                  December 6, 1966

Antti K. Heilala

It is hereby certified that error appears in the above numbered patent requiring correction and that the said Letters Patent should read as corrected below.

Column 3, line 20, for "passage" read -- passages --.

Signed and sealed this 12th day of September 1967.

(SEAL)
Attest:

ERNEST W. SWIDER                                EDWARD J. BRENNER
Attesting Officer                                       Commissioner of Patents